Patented Sept. 8, 1925.

1,553,220

UNITED STATES PATENT OFFICE.

CHARLES FREDERICK CROSS, OF LONDON, ENGLAND.

MANUFACTURE OF NEW LIGNONE DERIVATIVES.

No Drawing. Application filed February 28, 1924. Serial No. 695,811.

*To all whom it may concern:*

Be it known that I, CHARLES FREDERICK CROSS, a subject of the King of Great Britain, residing in London, England, have invented certain new and useful Improvements in the Manufacture of New Lignone Derivatives, of which the following is a specification.

Lignone derivatives obtained in soluble form by treatment of ligno-cellulose materials with sulphurous acid in strong aqueous solution, retain the more important constitutional characteristics of the lignone complex as it occurs in the plant substance.

I have found, however, that in the process changes occur (*a*) by combination with the acid-group to a sulphonic acid and (*b*) by de-oxidation of oxy-groups of the lignone with formation of the equivalent of sulphuric acid.

This derivative form of lignone is obtained by the process as chief component of the solution of about 7 per cent solids, which is formed by the treatment of the ligno-cellulose material and may be concentrated to a viscous liquid suitable for transport and contains from 30 to 40 per cent of solids. In concentrated form this lignone derivative is sensitive to the action of strong acids and if it be required to evaporate the solution to higher concentration, the sulphuric acid contained in it should first be separated, for instance by precipitation as barium sulphate in the original dilute solution; the solution so treated may be concentrated to higher limits without separation of the lignone derivatives in insoluble form.

According to the present invention this lignone derivative is converted into insoluble forms by treatment with certain oxidizing reagents. The products obtained are hydrated colloids (gels) which are useful both in substance and when produced in combination or admixture with other colloidal materials, as for instance textile fibres and goods made therefrom, or animal skins and fibres.

For controlled oxidation chromic acid is used with advantage, having specific effects in determining increase of aldehydic reactivity. These oxidations are carried out at ordinary temperatures. If the solution of lignone derivatives exceeds 10 per cent concentration, the solution should be cooled during reaction. The products are colloidal and the oxidized solutions containing the lignone and reduced chromium oxide ($Cr_2O_3$) gelatinize spontaneously even when containing as little as 10 per cent of the lignone solids. These effects of production of reactive CO groups and of gel formation are generally in proportion to the ratio $CrO_3$ to lignone solids, and in the final effect the modifications as specified are in proportion to the degree of oxidation.

For example, for a weak gel slowly formed the $CrO_3$ may amount to 15 per cent of the lignone solids, the strength of the gel and the rapidity of formation increasing until the $CrO_3$ amounts to about 60 per cent of the lignone solids.

These effects condition the application of the product to many industrial uses which take advantage of the restrained oxidation and slow production of the gel formed, so that the mixture may be applied to materials such as wood or textile materials in such a way that the gel formation occurs after application and therefore is formed within the substance of the wood or fabric. The gel formation in such a way represents the filling of the material as well as a fixation of the colloid in the insoluble form.

The following examples illustrate the invention:—

For sizing or filling wood structures and for coating wood surfaces: To 100 parts by weight of the solution of lignone derivative, containing 10—20 parts of the latter, chromic acid ($CrO_3$) amounting to 15—60 per cent of the lignone derivative is slowly added in the form of a solution while stirring to ensure rapid mixture. The mixture may immediately be applied with a brush, or by spraying or other mechanical means. After application the gel formation occurs within the wood structure. With the subsequent diffusion of the water and drying or desiccation the lignone-chromium-oxide colloid is fixed in the insoluble state. The oxidation and the subsequent effects may be controlled by cooling the solution during the oxidation, for instance, by taking care that the temperature does not rise appreciably above 16° C. the solution can be preserved for 24 hours before gel formation becomes apparent. In using a sodium bichromate solution, any free sulphuric acid or the constituent acid groups of the lignone derivative may be combined, more or less, with the sodium of the sodium bichromate. An insoluble chromate such as lead chromate may be used with more concentrated solution, of sufficient viscosity to hold the chromate in suspension. These more concentrated oxidized solutions are of advantage in coating wood surfaces producing the effect of a paint or varnish.

For sizing or filling textile materials such as hemp and flax canvases, jute hessians or cotton goods, the oxidized solutions are similarly prepared and are applied by any of the ordinary mechanical means.

Thus, if the goods are treated in continuous length the solution may be applied in a mangle, the goods being impregnated in the trough, and passed through the squeezing rollers to remove excess. The more concentrated forms of the oxidized solution may be applied by means of a spreading machine, or even when suitably prepared by means of printing blocks or machines, for producing local effects, or decorative designs. On the other hand, more dilute solutions may be applied in a dyeing jigger, to impregnate goods with the oxidized products to function as mordants for colouring matters and effects.

Having thus described the nature of the said invention and the best means I know of carrying the same into practical effect, I claim:—

1. A manufacture of new lignone derivatives, which consists in treating with an oxidizing agent, soluble lignone derivatives obtained by treatment of ligno-cellulose materials with sulphurous acid.

2. A manufacture of new lignone derivatives, which consists in treating with chromic acid a solution of soluble lignone derivatives obtained by treatment of ligno-cellulose materials with sulphurous acid.

3. A manufacture of new lignone derivatives, which consists in treating a solution of soluble lignone derivatives obtained by treatment with sulphurous acid of ligno-cellulose materials, with a proportion of chromic acid adapted to effect a partial oxidation of the said soluble lignone derivatives.

4. A manufacture of new lignone derivatives, which consists in oxidizing a solution of soluble lignone derivatives obtained by the treatment with sulphurous acid of ligno-cellulose materials, with chromic acid within the interspaces of a porous material.

5. As new articles of manufacture, insoluble lignone derivatives in the form of hydrated colloids obtained by the oxidation of lignone derivatives resulting from the treatment of ligno-cellulose materials with sulphurous acid.

6. As new articles of manufacture, insoluble lignone derivatives in the form of hydrated colloids obtained by the oxidation by chromic acid of lignone derivatives resulting from the treatment of ligno-cellulose materials with sulphurous acid.

7. As new articles of manufacture, lignone derivatives in the form of hydrated colloids containing chromium oxide, obtained by the oxidation with chromic acid of lignone derivatives resulting from the treatment of ligno-cellulose materials with sulphurous acid.

In testimony whereof I have signed my name to this specification.

CHARLES FREDERICK CROSS.